United States Patent
Asada et al.

[11] Patent Number: 6,135,228
[45] Date of Patent: *Oct. 24, 2000

[54] HUMAN TRANSPORT SYSTEM WITH DEAD RECKONING FACILITATING DOCKING

[75] Inventors: Haruhiko H. Asada, Concord; Stephen Mascaro, Somerville, both of Mass.; Joseph Spano, Lodi, Calif.

[73] Assignee: Massachusetts Institute of Technology, Cambridge, Mass.

[*] Notice: This patent issued on a continued prosecution application filed under 37 CFR 1.53(d), and is subject to the twenty year patent term provisions of 35 U.S.C. 154(a)(2).

[21] Appl. No.: 08/840,522

[22] Filed: Apr. 21, 1997

Related U.S. Application Data
[60] Provisional application No. 60/016,191, Apr. 25, 1996.

[51] Int. Cl.[7] .................................................. B62D 1/22
[52] U.S. Cl. ........................... 180/204; 180/6.5; 180/168
[58] Field of Search .................................. 180/168, 6.48, 180/6.5, 204, 20, 65.1, 199; 701/22

[56] References Cited

U.S. PATENT DOCUMENTS

| | | | |
|---|---|---|---|
| 3,789,947 | 2/1974 | Blumrich | 180/20 |
| 3,892,282 | 7/1975 | Wulc | 180/6.5 |
| 4,067,409 | 1/1978 | DiMatteo et al. | 180/6.5 |
| 4,137,984 | 2/1979 | Jennings et al. | 180/168 |
| 4,413,693 | 11/1983 | Derby | 180/74 |
| 4,987,620 | 1/1991 | Sharon | 5/60 |
| 5,186,270 | 2/1993 | West | 180/6.62 |
| 5,213,176 | 5/1993 | Oroku et al. | 180/168 |
| 5,555,582 | 9/1996 | Jerideau | 5/600 |

FOREIGN PATENT DOCUMENTS

| | | |
|---|---|---|
| 296 03 698 U1 | 8/1996 | Germany . |
| 6-171562 | 12/1992 | Japan . |
| 93/20791 | 10/1993 | WIPO . |

OTHER PUBLICATIONS

Salisbury, J. Kenneth, "Active Stiffness Control of a Manipulator in Cartesian Coordinates", *Proceedings of the IEEE Conference on Decision & Control, including the Symposium on Adaptive Processes*, Dec. 1980, pp. 95–100.

Whitney, D.E., "Quasi–Static Assembly of Compliantly Supported Rigid Parts", *Journal of Dynamic Systems, Measurement, and Control*, Mar. 1982, vol. 104, pp. 65–77.

West et al., "Design of Ball Wheel Vehicles with Full Mobility, Invariant Kinematics and Dynamics and Anti–Slip Control", *Robotics; Kinematics, Dynamics and Controls*, DE–vol. 72, 1994.

West et al., "Design of a Holonomic Omnidirectional Vehicle", 1992 IEEE International Conference on Robotics and Automation.

*Primary Examiner*—J. J. Swann
*Assistant Examiner*—Michael Cuff
*Attorney, Agent, or Firm*—Bromberg & Sunstein LLP

[57] ABSTRACT

A hybrid personal vehicle capable of holonomic omnidirectional self-locomotion. The vehicle may be programmed to navigate to a specified location in a crowded household environment. Additionally, sensors are provided for accurate docking and tight mating with fixtures such as a toilet or bed. A controller determines a docking trajectory to a specified fixture and behaves with arbitrary stiffness in each degree of freedom about a determined center of compliance.

20 Claims, 5 Drawing Sheets

HUMAN TRANSPORT SYSTEM WITH DEAD RECKONING FACILITATING DOCKING

The present application claims priority from U.S. provisional application Ser. No. 60/016,191 filed Apr. 25, 1996.

FIELD OF THE INVENTION

This invention relates to an omnidirectional personal vehicle having dead reckoning capability and sensors for enabling docking of the personal vehicle into fixtures such as a toilet or a bed.

BACKGROUND OF THE INVENTION

Caring for the bedridden at home is one of the hardest tasks faced in elder care. More than 80 percent of the elderly currently residing in nursing homes or hospitals are there primarily because they could no longer be treated at home after having been left permanently bedridden.

Transferring the bedridden from a bed to a wheelchair is an extremely laborious, physical job, which average people are unable to perform without the use of special equipment. A variety of equipment for lifting the bedridden has been developed and deployed at both hospitals and homes. Most of the hoists, however, are awkward, uncomfortable, and often even frightening for the elderly. During the transfer, the body is not supported from beneath and tends to swing and rotate, causing great embarrassment for the patient.

Unassisted transfer from a wheelchair to a bed or a toilet requires the automated docking of a mobile unit with a fixture. Docking, or, more generally, rigid part insertion, has been performed as a part of robotic assembly tasks. Typically, rigid part insertion entails the support of the part with compliant mechanical elements or else simulating compliance through softening of servo gains. Other methods have used force sensing and active feedback such as stiffness control and impedance control.

The case of docking a personal transportation vehicle differs from typical robot assembly tasks in several crucial respects which make existing methods inapposite. First, a wheelchair is large and heavy, and has a low bandwidth and poor backdriveability. Insertion must take place slowly to avoid jerks. Furthermore, initial misalignments may be much greater than normal since the vehicle may travel long distances without course corrections. Finally, the geometric and mechanical design of the mating elements of the bed and chair may not be subject to unitary design. These considerations require a new method of force guided docking for use with an omnidirectional chair which is a subject of the present invention.

SUMMARY

An approach to the care of bedridden persons taken in accordance with various embodiments of the present invention completely eliminates the need for transferring the patient between a bed or other fixture and a wheelchair by providing a hybrid personal vehicle that serves both as a wheelchair and as a bed. When the personal vehicle is used as a wheelchair, the patient can take various sitting positions and move around freely within a house. When the personal vehicle is used as a bed, the patient can lie flat in a commodious space. Moreover, the wheelchair can be docked to a toilet directly and automatically so that the bedridden can use a toilet without changing the person's seating. This allows the bedridden to depend less upon caregivers and thereby maintain dignity in their living.

In accordance with an embodiment of the present invention, there is provided a vehicle for docking against any sort of fixture. The vehicle has a ground contacting assembly capable of motion in a plane, the motion being holonomic with respect to three degrees of freedom. Additionally, the vehicle has a motor drive for propelling the ground contacting assembly in a predetermined direction and a controller for determining a docking trajectory to the fixture, the controller being programmed to behave with specified stiffness in each degree of freedom about a determined center of compliance. In accordance with other embodiments of the invention, the vehicle may also have a support coupled to the ground contacting assembly for supporting a person and an instrumented bumper for sensing contact between the vehicle and the fixture. The instrumented bumper may have at least two separately activated components for separately measuring contact forces on opposite sides of the vehicle and may include pressure sensors for measuring contact forces between the vehicle and the fixture. The pressure sensors may be discrete or continuous. The magnitudes and locations of forces between the vehicle and the fixture may be independently determinable.

In accordance with still further embodiments of the invention, the support may be configured as a cushioned seat and as a mobile bed for docking with a U-shaped bed fixture. The support may include a platform for accommodating the person in at least one of seated and reclining positions, as well as a plurality of tactile sensors for measuring pressure exerted on parts of the person by the support. The support may provide for sanitary engagement of a toilet fixture.

The ground contacting assembly of the vehicle may have three or more ball wheels and a plurality of encoders 45 (shown in FIG. 3) for measuring rotation of the wheels, as well as at least one sensor for detecting wheel slippage.

In accordance with another aspect of the invention, a vehicle is provided for transporting a body to a target location. The vehicle has a ground contacting assembly capable of holonomic motion, and the ground contacting assembly has at least three ball wheels, at least one motor drive coupled to each ball wheel, and a controller for determining a trajectory to the target location, subject to topological constraints, and for steering the vehicle in accordance with the determined trajectory. In accordance with other embodiments of the invention, the vehicle may also have a support for supporting a person, a plurality of encoders for measuring rotation of the wheels, at least one sensor for detecting wheel slippage, load sensors 49 (shown in FIG. 3) for measuring a load supported by each wheel, a platform for accommodating the person in at least one of seated and reclining positions. Additionally, the controller may include means for optimizing the trajectory for comfort to the person.

BRIEF DESCRIPTION OF THE DRAWINGS

Advantages of the embodiments of the present invention will be seen when the following detailed description is read along with the attached drawings. These drawings are intended to provide a better understanding of the present invention, but they are in no way intended to limit the scope of the invention.

DETAILED DESCRIPTION OF SPECIFIC EMBODIMENTS

Referring, first, to FIGS. 1(a)–1(d), schematic views are shown of several configurations of a system embodying a reconfigurable, holonomic, omnidirectional personal vehicle, designated by numeral 10. The term "holonomic," as used in this description and in the appended claims, means capable of arbitrary motion in an arbitrary direction on a planar surface. Thus, a holonomic vehicle may rotate at an arbitrary rate while simultaneously translating in an arbitrary direction. Such capability may also be referred to as non-singular omnidirectional mobility. Motion of a holonomic vehicle in an arbitrary direction is independent of initial configuration of the vehicle either with respect to component parts of the vehicle or its relation to fixed points in the surrounding environment. A full mathematical treatment of the motion of holonomic vehicles may be found in West and Asada, "Design and Control of Ball Wheel Omnidirectional Vehicles, *IEEE International Conference on Robotics and Automation*, (June, 1995), pp 1931–38."

Figure 1A:
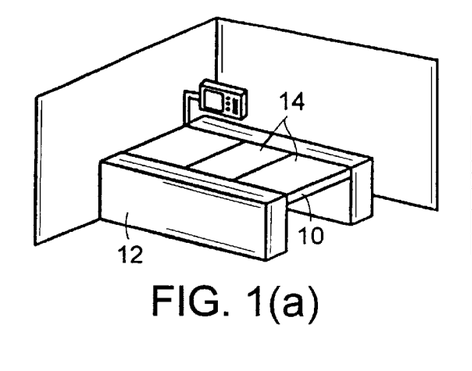
FIG. 1(a) shows a perspective view of a personal vehicle docked with a bed in accordance with a preferred embodiment of the invention.
Figure 1B:
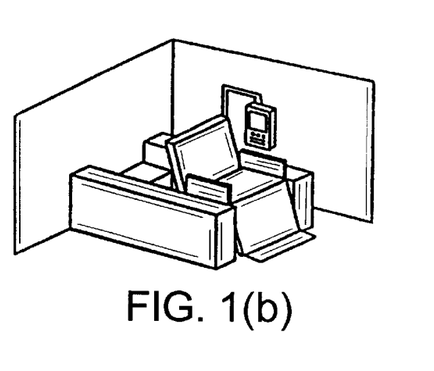
FIG. 1(b) shows a perspective view of the personal vehicle of FIG. 1(a) emerging from a bed docking configuration.

Referring, more particularly, to FIG. 1(a), personal vehicle 10 is shown in a docked position with respect to bed 12 which is U-shaped, in one embodiment of the present invention. Personal vehicle 10 is referred to as "reconfigurable," in that segments 14 may be configured in a reclining position as shown in FIG. 1(a), or, alternatively, to support a person in a sitting position, as shown in FIG. 1(b), with arm rests 16 and a foot rest 18 deployed. Undocking of personal vehicle 10 from bed 12 may also entail vertical motion, up or down, of the person-supporting surfaces 14, with respect to their level in the docked position.

Figure 1C:
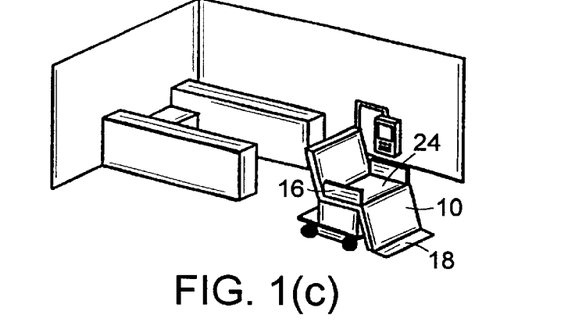
FIG. 1(c) shows a perspective view of the personal vehicle of FIG. 1(a) operating in a chair mode.

In FIG. 1(b), personal vehicle 10 is shown to have slid off from bed portion 12. FIG. 1(c) shows personal vehicle 10 having been moved from bed portion 12 until completely undocked.

Figure 1D:
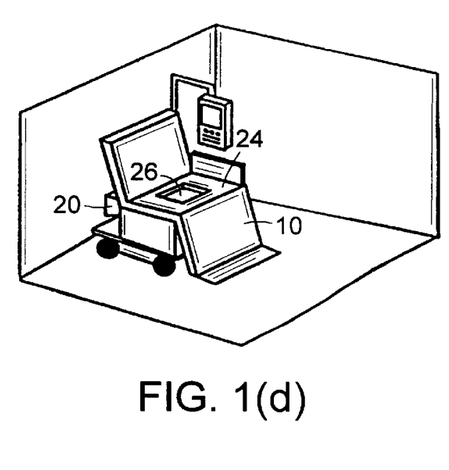
FIG. 1(d) shows a perspective view of the personal vehicle of FIG. 1(a) docked over a toilet.
Figure 1E:
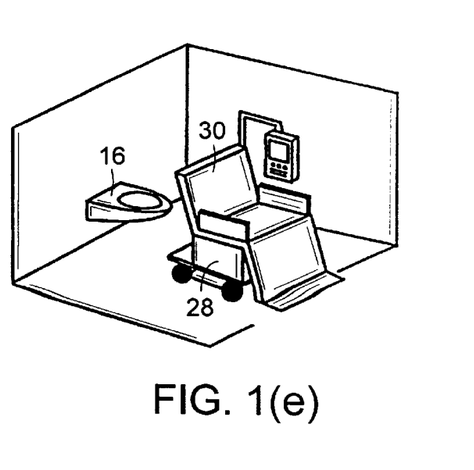
FIG. 1(e) shows a perspective view of the personal vehicle of FIG. 1(a) emerging from a toilet docking configuration.

FIG. 1(d) shows personal vehicle 10 docked directly to a toilet body 20, the rear portion of which is visible in FIG. 1(d). The back (not shown) of personal vehicle 10 may have an open space so that the toilet body can fit beneath seat 22 of vehicle 10. This embodiment of vehicle 10 is particularly suited for use with a wall-mounted toilet that comes out of a bathroom wall and clears the floor, however other configurations are readily apparent to persons skilled in the art and are within the scope of the appended claims. Toilet 20 may be equipped with a shower or bidet and dryer for automatic cleaning, while seat 24 of vehicle 10 has a window 26 for engagement with toilet 16 for maintaining a clean and sanitary seal. FIG. 1(e) shows vehicle 10 fully undocked from toilet 16. In addition to the application of the docking feature of vehicle 10 to bed and toilet fixtures as described, vehicle 10 may also be used for docking with any other household fixture such as a desk, musical instrument, etc.

The hybrid chair/bed, referring to sections 14 shown in FIG. 1(a), and otherwise referred to as a "support," mounted on the ground-contacting assembly 28 (shown in FIG. 1(e)) of vehicle 10 may have the degrees of freedom to recline and raise the back 24 as well as to fold and extend the foot rest 18 all the way from the up-right position to the completely flat position. In addition, the height and slope of the seat may be adjustable depending on the patient's body dimensions. The desired height and slope for the bed configuration may be different from those for the chair configuration, hence the seat height and slope are adjustable. To meet these requirements, the reconfigurable chair/bed may have four active internal degrees of freedom. The seat 24 and back 30 can be raised gradually in order to push the back of the infirm person up to an almost up-right position, should the person wish to stand up. Likewise, the seat 24 and back 30 of the chair can be lowered slowly so that the infirm person can sit down with a minimum of effort. Moreover, by extending the stroke of each degree of freedom, the chair 10 can be used for assisting the elderly in standing and sitting.

Figure 2:
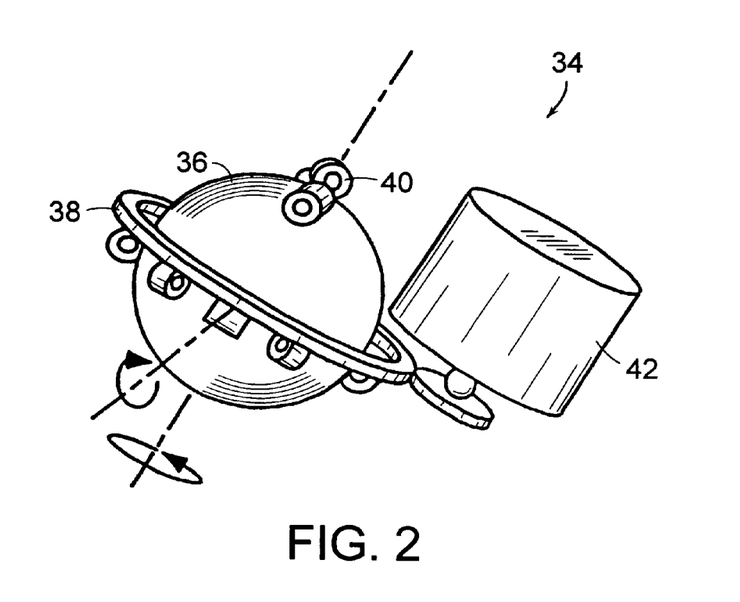
FIG. 2 shows a side view of a ball wheel mechanism employed in a personal vehicle in accordance with an embodiment of the present invention.

Referring now to FIG. 2, precise docking or undocking in a crowded living space requires high maneuverability and omni-directional motion. To this end, a holonomic omnidirectional platform is used as the ground-contacting assembly. Holonomic omni-directional vehicles have been developed by different groups in the last several years, including, for example, the OmniTrack described by West & Asada, "Design of a Holonomic Omnidirectional Vehicle," *IEEE International Conference on Robots and Automation*, (May, 1992).

In a preferred embodiment of the invention, a holonomic vehicle mechanism is used for the ground-contacting assembly based on the ball wheel mechanism by West and Asada (1995), cited above. The ball wheel mechanism, designated generally by numeral 34, has no singularity in its entire configuration space, and allows for precision dead reckoning and smooth motion. FIG. 2 shows the ball wheel 34 with a special ring mechanism. The ball 36 is held by a roller ring 38 at a great circle of ball 36, as well as by a set of chassis mounted rollers 40 arranged on another great circle of ball 36. Roller ring 38 is rotated by motor 42, preferably a servo motor, to drive ball wheel 34 in the direction referred to as the "active direction". Since roller ring 38 is inclined, a traction force is created between the ball wheel 34 and the floor. The vehicle has at least three ball wheels, each generating a traction force in a different direction. The resultant force acting on the vehicle is given simply by the vectorial sum of the traction forces. Varying the combination of the traction forces creates an arbitrary force and moment driving the vehicle. It should be noted that, to move the vehicle in an arbitrary direction, each ball wheel must not be over-constrained. In this ball wheel mechanism, each ball wheel is held by the ring mechanism in such a way that the ball can rotate freely along the chassis mounted rollers. Thus, the whole body of the ring is actively rotated by the servo motor, but the small rollers arranged on the ring allow the ball to rotate freely in the direction perpendicular to the active axis. Therefore the three ball wheels do not interfere with each other.

Figure 3:
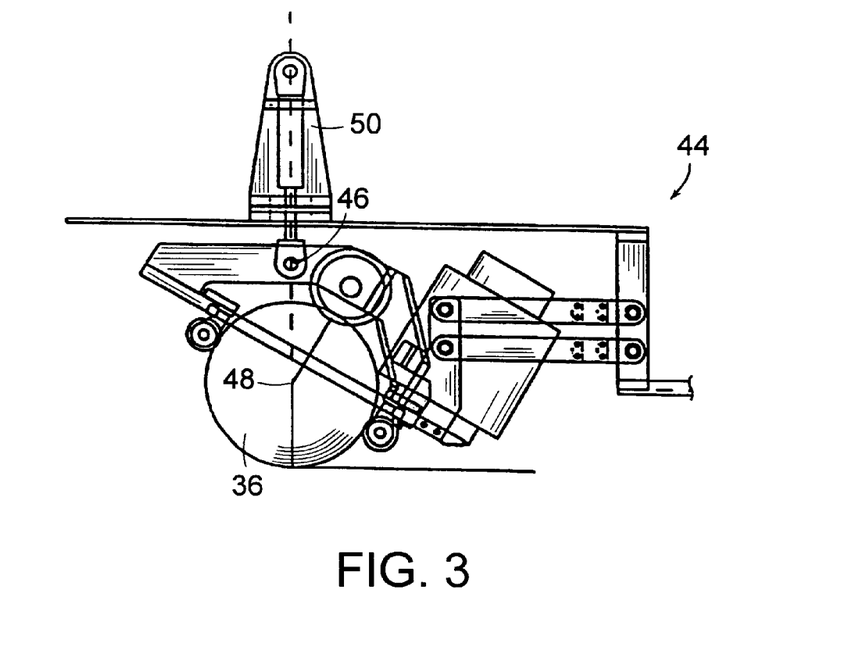
FIG. 3 is a side view in cross-section of a suspension system for an omnidirectional holonomic personal vehicle in accordance with an embodiment of the invention.

FIG. 3 shows a side view in cross-section of a suspension system, designated generally by numeral 44, for a holonomic vehicle in accordance with an embodiment of the invention. The weight of the payload is transmitted through a point 46 directly above center 48 of ball 36 by air cylinder shock absorber 50. Shock absorber 50 provides both stiffness and damping while minimizing bending moments on the suspension and wheel.

Figure 4:
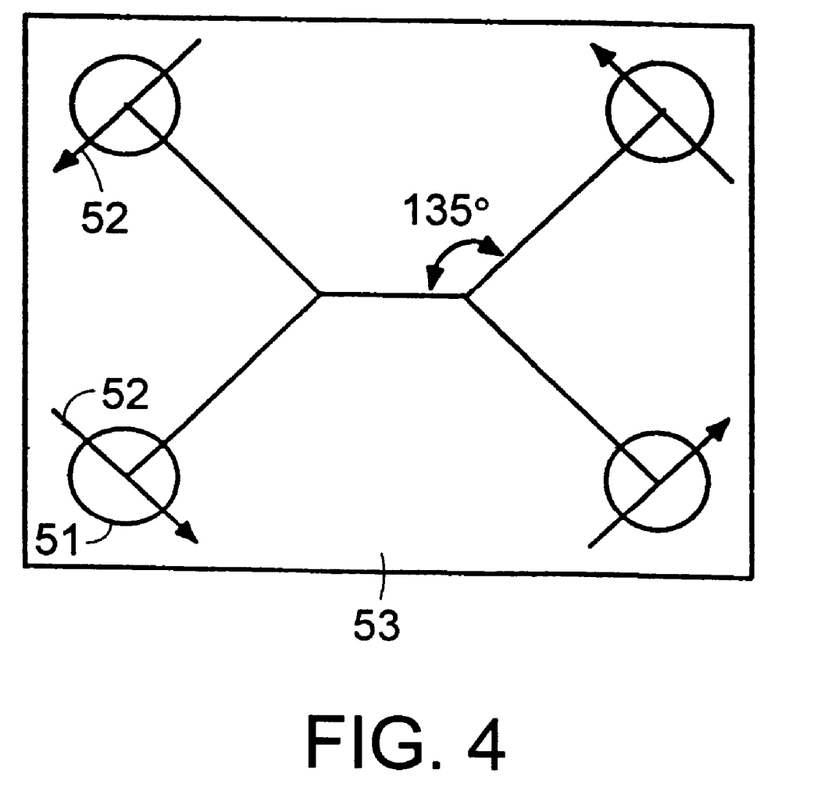
FIG. 4 shows a footprint of a holonomic personal vehicle in accordance with an embodiment of the present invention.

FIG. 4 shows a schematic of a configuration of wheels for a four-wheeled embodiment of the holonomic vehicle subject of the present invention. Circles 51 indicate mounting positions of ball wheels, while arrows 52 indicate directions of active wheel drive. Active directions 52 are oriented at 45 degree angles with respect to chassis rectangle 53 so as to equalize the distribution of mobility in all directions to the greatest extent. The three-wheeled omnidirectional holonomic vehicle has limitations making the use of four wheels preferable in certain applications. In particular, the small triangular footprint of a three-wheeled system makes it unstable and prone to tipping over when carrying heavy payloads having a high center of gravity and variable location, therefore impairing its safety for use as a wheelchair. Sufficient ground clearance and a suspension system may be provided to aid in navigation of potentially rough terrain and comfort for a human occupant. A four wheeled omnidirectional holonomic vehicle may provide augmented stability, comfort, and terrain handling as well as redundancy in traction. The footprint of the four-wheeled vehicle should be as large as possible in all directions but small enough to navigate through typical residential doorways, bathrooms, etc. Suspension system 44 (shown in FIG. 3) provides ride comfort, and ensures that all wheels maintain traction with the floor. The four wheels are placed at the corners of the chassis so as to maximize the footprint for the given chassis. A preferred embodiment of the invention employs a rectangular footprint which is 22.26 in long by 16.26 in wide.

Figure 5A:
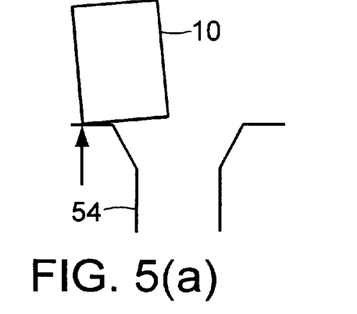
FIGS. 5(a) and 5(b) illustrate lateral and orientational docking error, respectively, upon contact of a personal vehicle with a fixture at the onset of a docking maneuver.
Figure 5B:
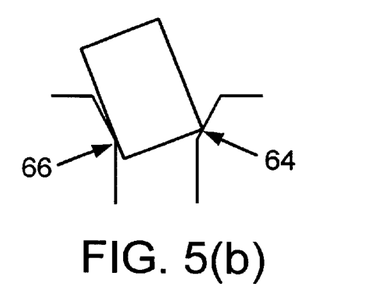

Referring now to FIGS. 5(a) and 5(b), the overall goal for functionality of the vehicle in regard to docking is that it be able to successfully, robustly, and safely dock itself automatically with both the bed and toilet, and perhaps with other stations in the home. The system which is a subject of the present invention is capable of docking smoothly with very small tolerances under a variety of initial alignments. Additionally, it is desirable to maximize ride comfort for the human who is sitting in the chair, especially during docking maneuvers. It is therefore important to minimize the jerk and impact forces felt by the human during the docking operation. The vehicle when fully loaded, is limited in backdriveability. Therefore compliance control alone without force feedback cannot guarantee smooth docking with low impact forces.

Since the vehicle might be required to travel long distances over imperfect terrain to reach the bed or other docking fixture, the initial misalignment with the fixture may be much larger than that of more routine robotic assembly. FIGS. 5(a) and 5(b) illustrate lateral and angular or orientational docking error, respectively, upon contact of personal vehicle 10 with a fixture 54 at the onset of a docking maneuver.

Figure 6A:
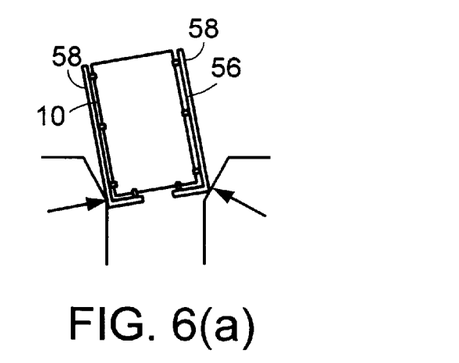
FIG. 6 is a schematic diagram illustrating the determination of the location of contact forces in the course of docking a personal vehicle to a fixture in accordance with an embodiment of the present invention.
Figure 6B:
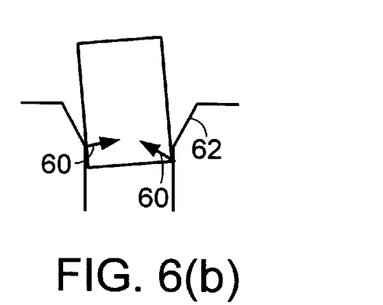

Referring now to FIGS. 6(a) and 6(b), an instrumented bumper 56 is provided, consisting of a rail 58 or system of rails 58 about the perimeter of vehicle 10, as shown in FIG. 6(a). Bumper 56 is designed with a specific set compliances, either discrete or distributed, and is equipped with pressure sensors (not shown) measuring contact forces 60 with the fixed portion 62 of the fixture. This bumper system as shown, has at least four distinct advantages:

1. The bumper alleviates impacts and jerk during the docking process by design with a sufficiently large stroke and small stiffness such that the vehicle can react slowly and smoothly to contact forces.

2. The compliance of the bumper is much greater than the compliance due to part deformation in a typical peg insertion task. Therefore, wedging can be tolerated without causing physical damage, and docking can proceed under wedging conditions. Whitney, "Quasi-Static Assembly of Compliantly Supported Rigid Parts," *ASME Journal of Dynamic Systems*, (March, 1982), herein incorporated by reference, defines the smallest angle $\theta_w$ at which wedging occurs by $$\theta_W = \frac{c}{\mu},$$

where $\mu$ is the coefficient of friction and $c$ is the clearance ratio. When $c$ is very small, i.e., the peg width and hole width are nearly equal, the bumper compliance can effectively allow the clearance to increase by factors as large as 10, and therefore allow the minimum wedging angle to increase by the same factor.

3. The embedded sensors in the bumper allow the vehicle to be docked using active force feedback. The bumpers are sensitive enough to measure forces which the vehicle could not otherwise respond to, i.e. forces which would be too small to overcome the friction of the wheel mechanisms and backdrive the vehicle.

4. Finally, unlike traditional peg insertion using a wrist force sensor in which the resultant force and moment of contact forces are measured, the instrumented bumper detects individual contact forces. For example, the two contact forces 60 in FIG. 6(b) are measured separately rather than measuring their vectorial sum. Therefore, various contact configurations (states) can be clearly distinguished, and the vehicle can be guided correctly despite a large misalignment. In particular, this separate contact force measurement allows direct estimation of the wedging force, i.e. the force acting between two opposing contact points 64 and 66 (shown in FIG. 5(b)), which is not measurable using prior art peg insertion techniques.

Figure 7:
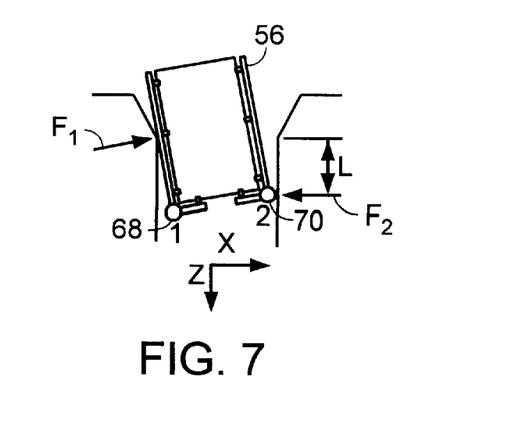
FIG. 7 is a further schematic diagram depicting the determination of the location of contact forces in the course of docking a personal vehicle to a fixture in accordance with an embodiment of the present invention.

Referring now to FIG. 7, operation of a preferred embodiment of bumper 56 is described. The bumper mechanism has at least two separate components to allow contact forces on either side to be measured separately. The bumper stiffness is typically an order of magnitude less than the suspension stiffness in order to avoid problems associated with non-collocated sensor feedback. The bumpers are preferably compliant enough and have a long enough stroke such that impact forces are not felt and decelerations can be kept below a few cm/sec$^2$. Additionally, sensors are preferably chosen and placed such that both magnitudes and locations of contact forces can be determined, in order that both the net lateral force and moment can be calculated.

While it is important to make direct measurements of the magnitude of the force, the location of the force applied can be determined by a knowledge of the contact state of the docking process. This can be accomplished by using a small number of simple contact sensors at critical points on the bumper. For example, FIG. 7 shows the bumper system with two contact sensors 68 and 70 at the front corners of the bumpers. If sensor 70 reports contact, then we know the force $f_2$ is applied at the front corner of the vehicle while force $f_1$ is applied at a distance L from the front of vehicle 10. Distance L is directly determined from the insertion depth, which is known by keeping track of the history of the docking process.

The most critical time in the docking process is when vehicle 10 is at a shallow insertion depth. The highest impact forces will occur during chamfer contact, and wedging is most likely to occur when the vehicle is barely inserted. Therefore, it is more important that the bumpers be sensitive towards the front of the vehicle than towards the back.

Figure 8:
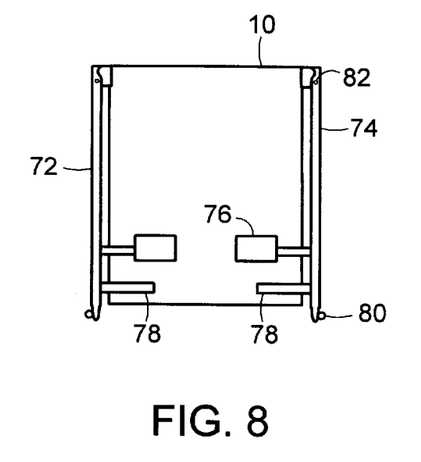
FIG. 8 is a top view of an embodiment of a bumper design for active docking of a holonomic personal vehicle to a fixture.

Based on these design requirements and considerations, the schematic of a preferred embodiment of the invention is shown in FIG. 8 which depicts a top view of vehicle 10 with dual single-degree-of-freedom bumpers 72 and 74 on either side of the vehicle. Each bumper is spring loaded at the front and pinpointed at the rear. A precision linear potentiometer 76 is placed near the springs 78 and is used to measure the bumper displacement, and, in turn, to calculate bumper force based on spring stiffness, employing Hooke's Law. A roller/limit switch 80 is imbedded in the front end to minimize friction while detecting contact.

The embodiment depicted in FIG. 8 includes the following features, among others:

The number of mechanical degrees of freedom have been kept to a minimum of two.

The pin joints at the rear allow the rail to bear loads in the insertion direction without putting transverse loading on the displacement sensors or springs.

The stroke of the bumper is approximately 1 degree of rotation, or approximately ½ inch at the point where the displacement sensor is attached. Under these conditions, the motion of the sensor at this point is sufficiently close to linear.

The compliance of the bumper increases from rear to front. There is actually a singularity at the pin joint 82 where the bumper is pinned. The significance of this will be addressed below.

Figure 9:
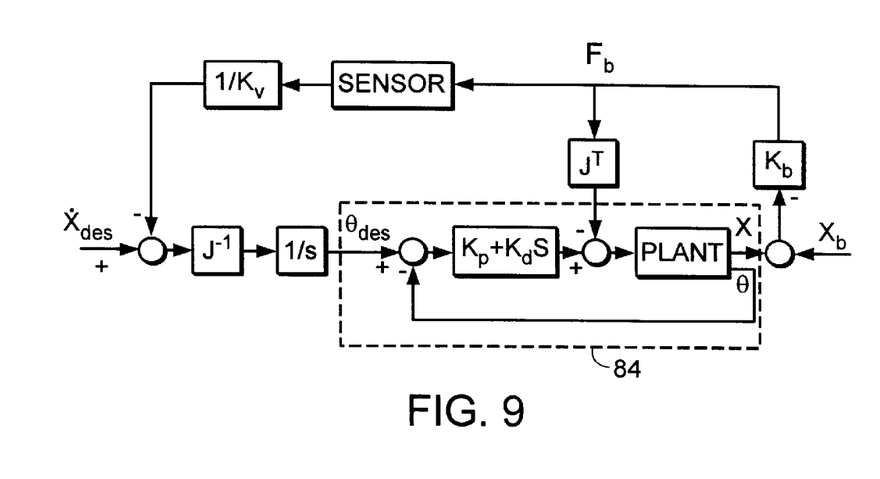
FIG. 9 is a schematic diagram of the control loop employed for controlling the docking of a personal vehicle with a fixture in accordance with an embodiment of the present invention.

Referring now to FIG. 9, a preferred embodiment of the invention employs a docking control scheme based on force feedback from the instrumented bumpers. The simplest way to accomplish this is to use stiffness control, which is a specific case of impedance control. As defined by Whitney (cited above), stiffness control works by controlling the position of the vehicle in response to forces imposed by the environment. More particularly, the force on the vehicle which is measured results from contact with the environment. In our case, that force will be proportional to the displacement of the bumper. We then use this force to calculate a desired vehicle deflection based on our specified vehicle stiffness.

At the pin pivot joint singularity it becomes impossible to control the vehicle via force feedback from the bumpers. Additionally, the stiffness of the bumper increases toward the singularity, thus there is an entire region requiring special treatment. One solution is to decrease the As shown in FIG. 9, an inner PD (proportional and derivative control) loop 84 is used to control the position of the wheels. The symbols have their usual meaning in the art, with F representing force, K representing stiffness, X representing position, and measure the bumper forces $F_b$, which are used to calculate the desired deflection of the vehicle based on the specified vehicle stiffnesses $K_v$, a diagonal tensor, the diagonal elements of which are the desired vehicle stiffnesses $K_x$, $K_y$, and $K_\theta$. The desired vehicle deflections are used to modify the nominal trajectory which is input to the position control loop. So far, this describes stiffness control alone. However, we are free to change the servo position gains. Wheel servo stiffnesses $K_w$ is calculated based on desired vehicle stiffnesses $K_x$, $K_y$, and $K_\theta$. Stiffness control algorithms are discussed by Salisbury, "Active Stiffness Control of a Manipulator in Cartesian Coordinates," *Proc. 19th IEEE Conf. on Decision and Control*, (Dec., 1980), which is herein incorporated by reference.

The wheel stiffness is:

$$K_w = J^T K_v J$$

where $K_v$ the vehicle stiffness tensor and J is the vehicle Jacobian. The docking strategy is therefore performed as follows:

1. During initial approach, information from contact sensors and displacement sensors are used to determine the state of the vehicle, and guide vehicle to the chamfer region of the fixture docking port, if it is not already there.

2. During early-middle stages of insertion, stiffness control is used to control lateral and angular displacements while insertion velocity is constant. Sensor measurements are also used to monitor wedging forces and act appropriately.

3. Beyond a certain insertion depth L, the position gains are altered in such a way as to drastically increase the rotational compliance of the vehicle, while maintaining stiffness control in the lateral direction as well as constant velocity in the insertion direction.

4. During all stages of the docking, the compliance center is located at the front of the vehicle to minimize the chances of jamming and wedging.

We claim:

1. A vehicle for docking against a fixture, the vehicle comprising:

a. a ground contacting assembly capable of motion in a plane, the motion being holonomic with respect to three degrees of freedom;

b. a motor drive for propelling the ground contacting assembly in a predetermined direction;

c. an instrumented bumper for sensing contact between the vehicle and the fixture; and d. a controller for determining a docking trajectory to the fixture, the controller being programmed to react to feedback from the instrumented bumper to control the motor drive such that the vehicle behaves with a variable specified stiffness in each degree of freedom about a determined center of compliance in such a manner as to steer the vehicle to the fixture.

2. A vehicle according to claim 1, further comprising a support coupled to the ground contacting assembly for supporting a person.

3. A vehicle according to claim 1, further comprising an instrumented bumper for sensing contact between the vehicle and the fixture.

4. A vehicle according to claim 3, wherein the instrumented bumper has at least two separately activated components for separately measuring contact forces on opposite sides of the vehicle.

5. A vehicle according to claim 3, wherein the instrumented bumper includes pressure sensors for measuring contact forces between the vehicle and the fixture.

6. A vehicle according to claim 5, wherein the pressure sensors are discrete.

7. A vehicle according to claim 5, wherein the pressure sensors are continuous.

8. A vehicle according to claim 3, wherein the magnitudes and locations of forces between the vehicle and the fixture are independently determinable.

9. A vehicle according to claim 2, wherein the support may be configured as a cushioned seat and as a mobile bed for docking with a U-shaped bed fixture.

10. A vehicle according to claim 2, wherein the support includes a platform for accommodating the person in at least one of seated and reclining positions.

11. A vehicle according to claim 2, wherein the support provides for sanitary engagement of a toilet fixture.

12. A vehicle according to claim 1, wherein the ground contacting assembly comprises at least three ball wheels.

13. A vehicle according to claim 12, further comprising a plurality of encoders for measuring rotation of the wheels.

14. A vehicle for transporting a body to a target location, comprising:
   a. a ground contacting assembly capable of holonomic motion, the ground contacting assembly comprising:
     i. at least three ball wheels;
     ii. a motor drive coupled to each ball wheel; and
   b. a controller for determining a trajectory to the target location, subject to topological constraints, programmed to react to feedback from an instrumented bumper, for controlling the motor drive in such a manner that the vehicle behaves with a variable specified stiffness in each degree of freedom and that the vehicle is steered to the target location in accordance with the determined trajectory.

15. A vehicle according to claim 14, further comprising a support for supporting a person.

16. A vehicle according to claim 14, further comprising a plurality of encoders for measuring rotation of the wheels.

17. A vehicle according to claim 14 additionally comprising a processor for calculating wheel slippage based at least upon rotation of the wheels measured by the plurality of encoders.

18. A vehicle according to claim 14, additionally comprising load sensors for measuring a load supported by each wheel.

19. A vehicle according to claim 15, wherein the support includes a platform for accommodating the person in at least one of seated and reclining positions.

20. A vehicle according to claim 15, wherein the controller includes means for optimizing the trajectory for comfort to the person.

* * * * *